US008314331B2

(12) United States Patent
Ejima

(10) Patent No.: US 8,314,331 B2
(45) Date of Patent: Nov. 20, 2012

(54) ELECTRICAL JUNCTION BOX

(75) Inventor: Takumi Ejima, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 248 days.

(21) Appl. No.: 12/801,302

(22) Filed: Jun. 2, 2010

(65) Prior Publication Data

US 2010/0326691 A1     Dec. 30, 2010

(30) Foreign Application Priority Data

Jun. 30, 2009  (JP) .................................. 2009-156377

(51) Int. Cl.
*H02G 3/08*     (2006.01)

(52) U.S. Cl. ............. 174/50; 174/58; 439/535; 248/906

(58) Field of Classification Search .................... 174/50, 174/58; 439/535; 248/906; 220/4.02
See application file for complete search history.

(56) References Cited

U.S. PATENT DOCUMENTS

| 6,768,054 | B2 * | 7/2004 | Sato et al. ........................ 174/50 |
| 7,878,579 | B2 * | 2/2011 | Yoshino et al. ............... 296/198 |
| 8,022,297 | B1 * | 9/2011 | Thibault .......................... 174/50 |

FOREIGN PATENT DOCUMENTS

| JP | U-07-042535 | 8/1995 |
| JP | A-10-228952 | 8/1998 |
| JP | A-11-238557 | 8/1999 |
| JP | A-2007-282425 | 10/2007 |

* cited by examiner

*Primary Examiner* — Dhirubhai R Patel
(74) *Attorney, Agent, or Firm* — Oliff & Berridge, PLC

(57) ABSTRACT

To provide an electrical junction box having a new structure that can be securely attached to a hole and can be readily removed even if a large clearance is required between the electrical junction box and a peripheral edge section around the attachment hole. An elastic projecting piece is integrally provided on a main body of an electrical junction box. The elastic projecting piece protrudes from an outer surface of the main body. The elastic projecting piece is provided with an engagement projection and an attachment projection that protrude outward from the main body opposite from each other in an extending direction of the elastic projecting piece to constitute an engagement fixing section. Elastic deformation of the elastic projecting piece permits the main body to be fitted into the attachment hole. A second inner peripheral edge portion around the attachment hole is clamped between the engagement and attachment projections.

6 Claims, 3 Drawing Sheets

ELECTRICAL JUNCTION BOX

INCORPORATION BY REFERENCE

This application claims priority to JP 2009-156377 filed in Japan on Jun. 30, 2009, the disclosure of which is hereby incorporated by reference in its entirety.

BACKGROUND

In accordance with an aspect of the exemplary embodiments, the embodiments relate to an electrical junction box to be mounted on a motor vehicle or the like and more particularly relates to an electrical junction box to be fitted into an attachment hole in a vehicle body panel to be mounted on a vehicle body.

Electrical equipment in a motor vehicle is generally contained within a box such as a fuse box, a junction box, or a connector holder. The electrical junction box is generally attached to a vehicle body panel in a vehicle room or an engine room. There is an electrical junction box in which a protruding amount into the vehicle room or the like is reduced by merely fitting the box into an attachment hole in the vehicle body panel when the box is mounted on the vehicle body panel.

Such electrical junction box has been disclosed in JP HEI 11(1999)-238557 A (Patent Document 1). The electrical junction box is generally provided with an engagement fixing section to be secured to an opening peripheral edge section around the attachment hole in the vehicle body panel. The electrical junction box can be secured to the vehicle body panel by merely fitting the engagement fixing section into the attachment hole. Such engagement fixing section includes a flange portion to be superimposed on a front side surface on a whole opening peripheral edge section around the attachment hole in the vehicle body panel, and a plurality of engagement pawls to be locked on a rear side surface on the opening peripheral edge section around the attachment hole in the vehicle body panel. When the electrical junction box is fitted into the attachment hole, the engagement pawls are elastically deformed to turn to the rear side of the vehicle body panel and the vehicle body panel is clamped between the engagement pawls and the flange portion. As a result, the electrical junction box is secured to the vehicle body panel.

When the electrical junction box is fitted into the attachment hole in the vehicle body panel, clearance should be left between the opening peripheral edge section around the attachment hole and the electrical junction box. Such clearance can be used to pass a cable through the vehicle body panel so as to arrange the cable in the vehicle body or it can be used as a service hole for maintenance.

However, in an attachment structure of the conventional electrical junction box as disclosed in Patent Document 1, there is a problem that it is difficult to provide a large clearance between an outer peripheral surface of the electrical junction box and the opening peripheral edge section around the attachment hole. That is, in order to form a large clearance, not only the flange portion to be provided on the outer peripheral surface of the electrical junction box must be extended greatly on the outer peripheral surface, but also the flange portion must be separated on the outer peripheral surface. This will cause a problem that strength of the flange portion itself and fixing strength of the flange portion onto the vehicle body panel are greatly reduced.

In addition, in the attachment structure of the electrical junction box disclosed in Patent Document 1, when the electrical junction box is removed from the vehicle body panel after mounting, there is a problem that it is difficult to release engagement pawls from a rear side surface of the vehicle body panel. That is, in order to release the engagement pawls from a front side of the vehicle body panel, it is generally necessary to provide the flange portion with a working hole for passing a tool such as a lever. This will cause a problem that a mold for the electrical junction box becomes complicated and a releasing work is troublesome since the tool must be inserted into a small hole to release the engagement pawls.

SUMMARY

In accordance with an aspect of the exemplary embodiments, it may be advantageous to address or overcome the problems discussed above by providing an electrical junction box having a new structure that can be strongly secured to an attachment hole and can be readily removed from the attachment hole even if a large clearance is required between an outer surface of the electrical junction box and an opening peripheral edge section around the attachment hole.

One preferred embodiment is directed to an electrical junction box including a main body and an engagement fixing section provided on the main body. The main body is fitted into an attachment hole in a vehicle body panel of a motor vehicle. The engagement fixing section is secured to the vehicle body panel. An elastic projecting piece is provided on the main body. The elastic projecting piece protrudes from an outer surface of the main body toward the attachment hole. The elastic projecting piece can be provided with an engagement projection and an attachment projection that protrude outward from the main body beyond the distal end of the projecting piece. The engagement and attachment projections are positioned opposite to each other at a distance corresponding to the thickness of the wall in which the attachment hole is located. The engagement and attachment projections constitute the engagement fixing section. Elastic deformation of the elastic projecting piece permits the main body to be fitted into the attachment hole. An inner peripheral edge section around the attachment hole is clamped between the engagement and attachment projections.

In accordance with a preferred embodiment, the engagement and attachment projections that clamp the vehicle body panel are provided on the elastic projecting piece that protrudes from the main body of the electrical junction box. Thus, even if a large clearance is defined between the main body and the inner peripheral edge section around the attachment hole, the engagement and attachment projections can clamp the inner peripheral edge section around the attachment hole separated apart from the main body, thereby firmly and strongly securing the main body to the attachment hole. Because the clearance between the main body and the inner peripheral edge portion is not closed, it is possible to attach the electrical junction box to the vehicle body panel while sufficiently holding arrangement of cables, maintenance, and the like.

Further, because it is possible for the main body to be fitted into and removed from the attachment hole by elastically deforming the elastic projecting piece, it is also possible for the electrical junction box to be mounted onto and removed from the vehicle body panel. Particularly, when the electrical junction box is removed from the vehicle body panel, it is possible to readily remove the electrical junction box from the front side of the vehicle body panel by operating the projecting portion of the elastic projecting piece that protrudes from the front side surface of the vehicle body panel without resorting to using a tool on the rear side of the vehicle body panel.

Also, the preferred embodiments can preferably adopt a structure wherein the attachment projection is disposed outside the engagement projection in the extending direction of the elastic projection piece, and a projecting height of the attachment projection is set to be greater than that of the engagement projection.

According to the this structure, it is possible to contact the attachment projection with the front side surface of the vehicle body panel more positively to engage the attachment projection with the front side surface while permitting the engagement projection to turn to the rear side of the vehicle body panel. Thus, it is possible to more positively prevent the elastic projecting piece from disconnecting from the vehicle body panel.

The preferred embodiments can preferably adopt a structure wherein the elastic projecting piece is provided on a distal end with an elastic deformation operating portion that elastically deforms the elastic projecting piece toward the main body in a releasing direction of the elastic projecting piece. According to the this structure, because the elastic deformation operating portion is disposed on the elastic projecting piece at the distal end, i.e., the most remote position from the proximal end that serves as a base point of elastic deformation, it is possible for a small force to readily release the elastic projecting piece from the inner peripheral edge section around the attachment hole by merely pushing the elastic deformation operating portion by a finger.

The preferred embodiments can preferably adopt a structure wherein the main body is provided with a base projection that protrudes from an outer peripheral surface of the main body, and the elastic projecting piece protrudes further outward from the base projection. According to this structure, it should be possible to restrain a stress concentrated in the proximal end of the elastic projecting piece upon elastic deformation and to enhance strength of the wall of the main body.

In accordance with the preferred embodiment, because the engagement and attachment projections are provided on the distal end of the elastic projecting piece that protrudes from the main body of the electrical junction box, the engagement and attachment projections can clamp the inner peripheral edge section around the attachment hole separated apart from the main body, thereby positively and strongly securing the electrical junction box to the vehicle body panel, even if a clearance is defined between the main body and the inner peripheral edge section around the attachment hole. Accordingly, the engagement and attachment projections should be spaced apart by a distance that corresponds to the thickness of the wall in which the attachment hole is located. Further, it is possible to release the elastic projecting piece from the inner peripheral edge section around the attachment hole by operating the projecting portion of the elastic projecting piece that protrudes from the vehicle body panel, thereby readily removing the electrical junction box from the front side surface of the vehicle body panel.

DETAILED DESCRIPTION OF EMBODIMENTS

Figure 1:
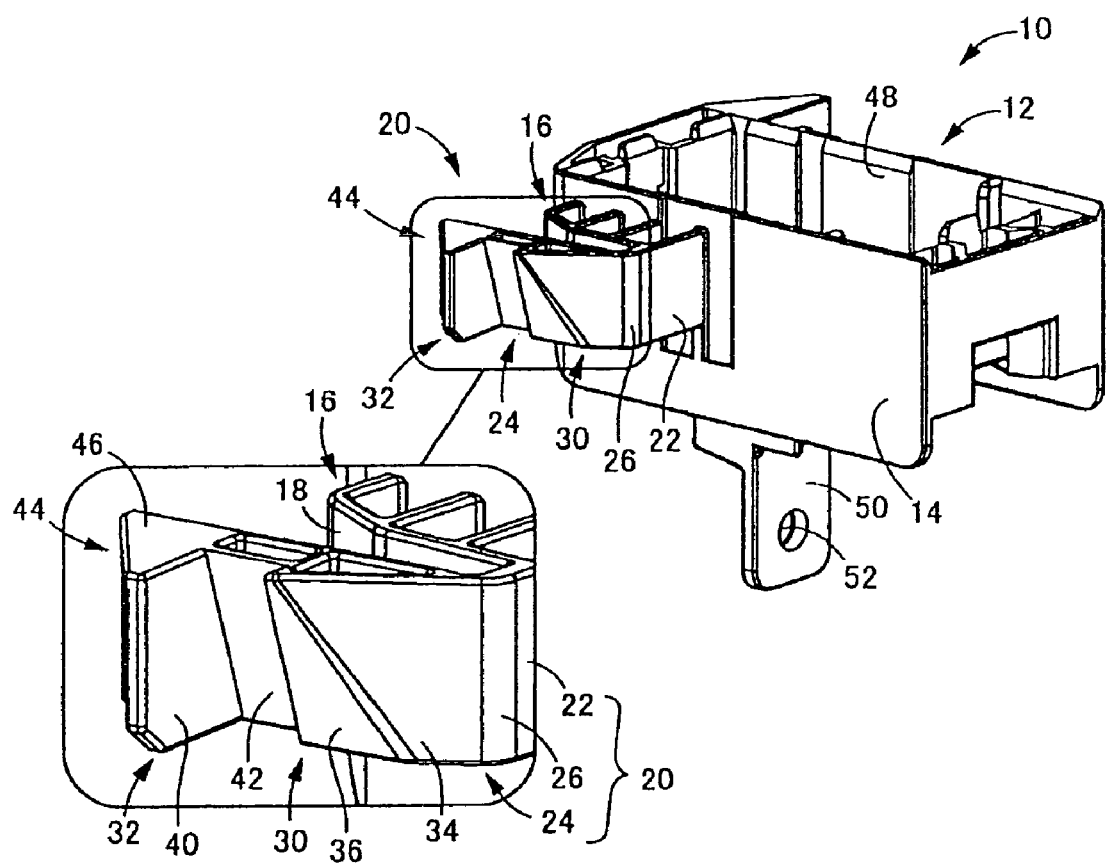
FIG. 1 is a perspective view of an embodiment of a connector holder in accordance with the present invention and an enlarged perspective view of a main part of the connector holder.

Referring now to the drawings, embodiments of an electrical junction box in accordance with an exemplary preferred embodiment will be described below in detail to clarify various aspects of the preferred embodiment.

Figure 2:
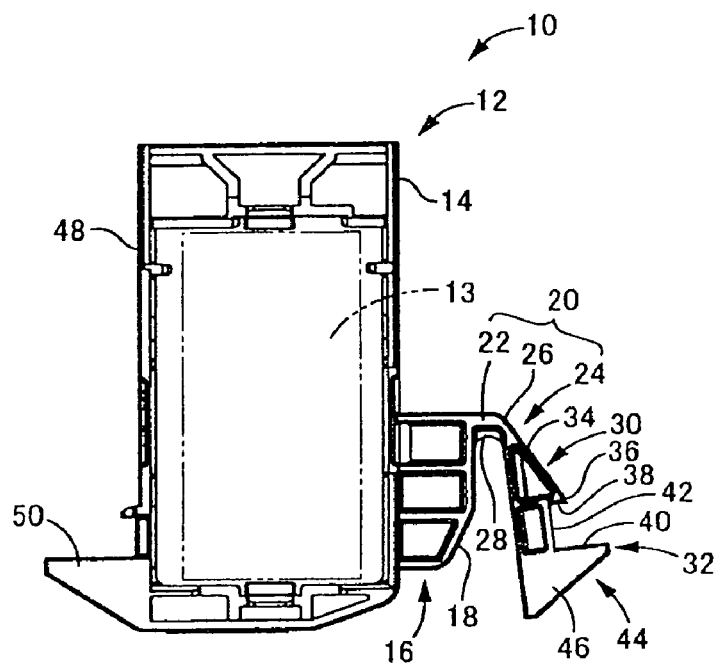
FIG. 2 is a top plan view of the connector holder shown in FIG. 1.
Figure 3:
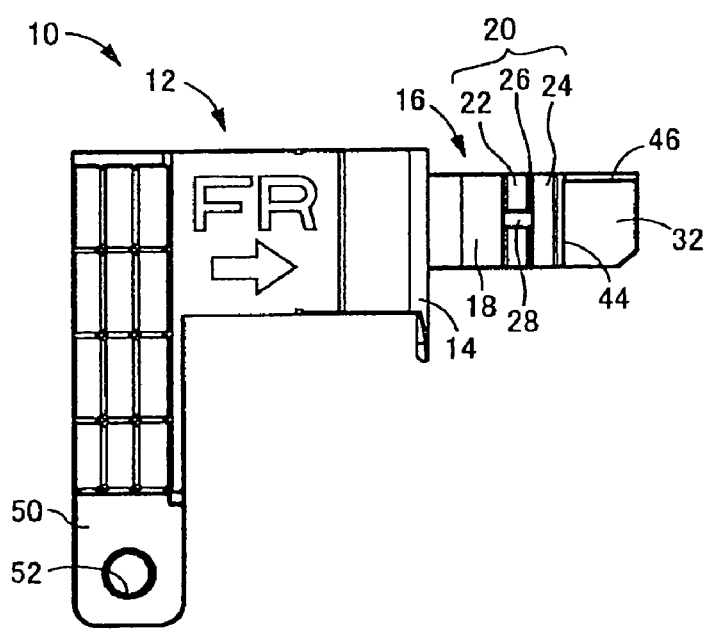
FIG. 3 is a front elevation view of the connector holder shown in FIG. 1.

FIGS. 1 to 3 show an embodiment of a connector holder 10 that is an example of an electrical junction box in accordance with an exemplary preferred embodiment. The connector holder 10 is a molded product made of a material such as synthetic resin. The connector holder 10 includes a main body 12 that serves as a main body of the electrical junction box. The main body 12 is substantially formed into a rectangular box-like configuration that is open at upper and lower sides (upper and lower sides in FIG. 3). This main body 12 constitutes a connector containing section. As shown in FIG. 2, a connector 13 can be contained and fixed in the main body 12 in an engagement manner or a fitting manner utilizing a lever.

Figure 4:
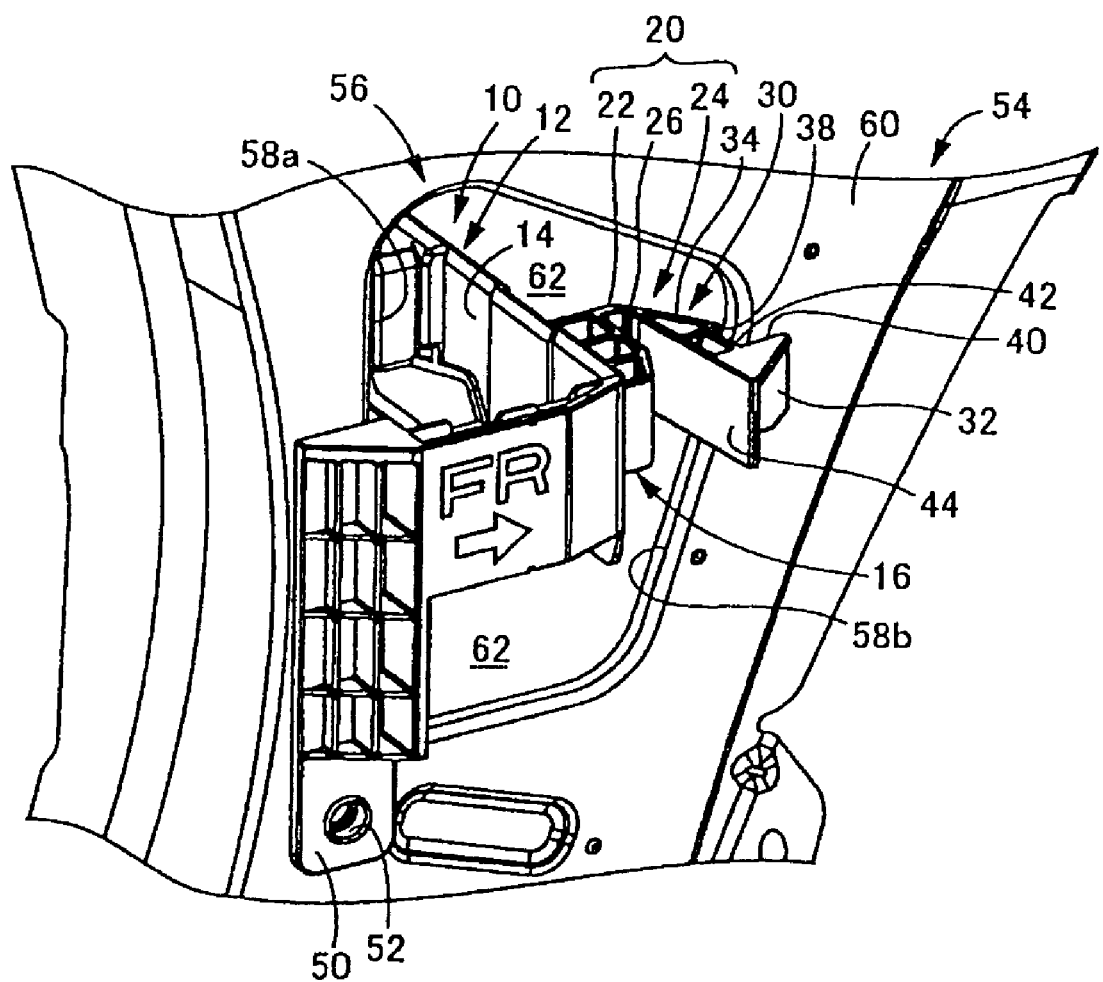
FIG. 4 is a perspective view of the connector holder shown in FIG. 1, illustrating the connector holder attached to a vehicle body panel.

The connector holder 10 can be inserted into and engaged with a hole 56 in a vehicle body panel 54 (mentioned after by referring to FIG. 4). Hereinafter, a lower side in FIG. 2 with respect to a fitting direction of the connector holder 10 designates a front side (front surface) of the connector holder 10 (main body 12) while an upper side in FIG. 2 with respect to the fitting direction designates a rear side (rear surface) of the connector holder 10 (main body 12). Upper and lower directions in FIG. 3 designate upper and lower directions of the connector holder 10 (main body 12).

A side wall 14 of the main body 12 is integrally provided on an outer peripheral surface with a base projection 16 that protrudes outward from the side wall 14. The base projection 16 is substantially formed into a rectangular block-like configuration. The base projection 16 is provided on a projecting end surface at the front side of the main body 12 with an escape surface 18 that gradually approaches the side wall 14 toward the front side.

Further, the base projection 16 is integrally provided on a rear edge part at the rear side of the main body 12 with an elastic projecting piece 20. The elastic projecting piece 20 is substantially formed into an L-shaped plate-like configuration. The elastic projecting piece 20 includes an outward extending portion 22 that protrudes outward from the projecting edge portion of the base projection 16 at the rear side of the main body 12 and a forward extending portion 24 that extends forward from an extending end portion of the outward extending portion 22 substantially in parallel with the side wall 14 of the main body 12. The outward extending portion 22 and forward extending portion 24 are interconnected through a curved portion 26 to each other. The forward extending portion 24 extends from a side of the curved portion 26, which is a proximal end side in an extending direction, to the front side of the main body 12, which is a distal end side in the extending direction, so that the forward extending portion 24 inclines slightly outward.

The elastic projecting piece 20 has a substantially constant width in the upper and lower directions. The width of the piece 20 is substantially the same as a width of the base projection 16 in the upper and lower directions. An outer surface of the curved portion 26 is formed into a smooth curved surface from the outward extending portion 22 to a slant guide inner surface 34 (mentioned after) of the forward extending portion 24 so as to avoid concentration of stress upon elastic deformation and so as to obtain sufficient strength. Further, the outward extending portion 22 is provided on an inner surface at a central part in the upper and lower directions with a reinforcement rib 28.

The forward extending portion 24 is integrally provided with an engagement projection 30 and an attachment projection 32 that protrude outward in a direction departing apart from the outer side surface of the main body 12. The engagement projection 30 and attachment projection 32 constitute an engagement fixing section.

The engagement projection 30 on the forward extending portion 24 is substantially formed into a right triangle block in plan view. The right triangle block is disposed at the rear side (at an upper side in FIG. 2) of the main body 12 and at a proximal end side in the extending direction. A slant portion of the engagement projection 30 is formed into a slant guide surface 34 that gradually protrudes outward from the curved portion 26 on the forward extending portion 24 to a distal end side in an extending direction. The slant portion of the engagement projection 30 is partially cut off and is provided with a slant surface 36 that extends along an inner peripheral surface on the attachment hole 56 in the vehicle body panel 54 mentioned after. The right triangle engagement projection 30 is provided on a base side with an engagement surface 38 that substantially stands upward vertically from the forward extending portion 24.

On the other hand, the attachment projection 32 on the forward extending portion 24 is disposed at the front side (at a lower side in FIG. 2) of the main body 12 and at a distal end side in the extending direction. The attachment projection 32 is formed into a projecting piece configuration that protrudes outward vertically to extend in a direction departing apart from the main body 12. The attachment projection 32 is provided on a rear side with a superimposing surface 40 that stands upward vertically from the forward extending portion 24.

The engagement projection 30 and attachment projection 32 are opposed to and separated from each other by a given distance in the extending direction of the forward extending portion 24. The attachment projection 32 is disposed at the distal end side than the engagement projection 30 in the extending direction of the forward extending portion 24. Thus, the engagement surface 38 and superimposing surface 40 are separated apart from each other by a given distance and are opposed in parallel with each other. A distance between the engagement surface 38 and the superimposing surface 40 is set to be equal to or slightly greater than a dimension in thickness of the inner peripheral surface around the attachment hole 56 in the vehicle body panel 54 mentioned after. An outer surface 42 on the forward projecting portion 24 disposed between the engagement surface 38 and the superimposing surface 40 is inclined to extend along the inner peripheral surface around the attachment hole 56 in the vehicle body panel 54, thereby enhancing stability of attachment to the vehicle body panel 54.

A projecting dimension of the attachment projection 32 from the forward projecting portion 24 is set to be greater than that of the engagement projection 30. Thus, the superimposing surface 40 is extruded outward from the main body 12 than the engagement surface 38. The superimposing surface 40 has an area greater than the engagement surface 38.

Further, the elastic projecting piece 20 is integrally provided on a distal end side in the extending direction at a front side of the main body 12 with an elastic deformation operating portion 44 that protrudes further forward from the attachment projection 32. When the elastic deformation operating portion 44 is pushed by a finger, the elastic projecting piece 20 can be elastically deformed toward the main body 12. Particularly, in the present embodiment, the elastic deformation operating portion 44 is integrally provided on an upper end edge portion with a triangular plate-like reinforcement wall 46 that protrudes outward from the main body 12 to be connected to the attachment projection 32, thereby enhancing strength of the operating portion 44. The elastic deformation operating portion 44 holds the finger to facilitate an operation of the elastic projecting piece 20.

Also, the main body 12 is integrally provided on a side wall 48 at a side opposite from the elastic projecting piece 20 with a flange-like attachment plate portion 50. The attachment plate portion 50 protrudes downward at the front side end of the main body 12. A projecting end of the attachment plate portion 50 is provided with a bolt passing hole 52. The distance between the side wall 48 and the outer surface 42 located on the distal end of the elastic projecting piece 20 should preferably be dimensioned so as to correspond to the width of the attachment hole 56. Based on this configuration, the main body 12 can be held firmly within the attachment hole 56 by the slight biasing of the elastic projection piece 20 against an edge of the attachment hole 56 as well as by the clamping of the wall of the vehicle body 54 between the engagement projection 30 and the attachment projection 32. See, for example, FIG. 4.

After the main body 12 contains the connector 13 or the like, the connector holder 10 constructed above is inserted into and secured to the attachment hole 56 in the vehicle body panel 54. The attachment hole 56 penetrates the vehicle body panel 54 in its thickness direction so that a wire harness, a tool, or the like can be inserted into the hole 56. The attachment hole 56 is preferably formed into a square shape with round corners (see FIG. 4) and an opening dimension is set to be greater than the main body 12. A first inner peripheral edge portion 58a defines one side of an inner peripheral edge section 58 around the attachment hole 56 and preferably extends straightly along the side wall 48 provided with the attachment plate 50 on the main body 12. A second inner peripheral edge portion 58b is located opposite to the first inner peripheral edge portion 58a and is preferably slanted with respect to the first inner peripheral edge portion 58a.

In order to attach the connector holder 10 to the vehicle body panel 54, the rear side part of the connector holder 10 is inserted into the attachment hole 56 from a front surface 60 of the vehicle body panel 54 along an insertion direction to a rear side of the vehicle body panel 54. The main body 12 is inserted into the attachment hole 56 so that the side wall 48 provided with the attachment plate portion 50 contacts the first inner peripheral edge portion 58a and the elastic projecting piece 20 is directed to the second inner peripheral edge portion 58b. When the connector holder 10 is inserted into the attachment hole 56, the elastic deformation operating portion 44 may be pushed to the main body 12 by a finger and the elastic projecting piece 20 may be elastically deformed toward the main body 12. However, in the present embodiment, because the slant guide surface 34 is provided on the proximal end of the elastic projecting piece 20 at the rear side of the main body 12, the main body 12 may be inserted into the attachment hole 56 and the elastic projecting piece 20 may be elastically deformed by a guiding action of the slant guide surface 34 and second inner peripheral portion 58b. Because the escape surface 18 is provided on the projecting end of the base projection 16, the elastic deformation of the elastic projecting piece 20 is not interfered with the base projection 16.

When the elastic projecting piece 20 is inserted into the attachment hole 56, the elastic projecting piece 20 elastically bends at the curved portion 26 towards the main body 12, and the engagement projection 30 passes behind the vehicle body panel 54 while the attachment projection 32 engages with the front side surface 60 of the vehicle body panel 54. Thus, as shown in FIG. 4, the second inner peripheral edge surface 58b around the attachment hole 56 is clamped between the engagement projection 30 and the attachment projection 32. The engagement surface 38 of the engagement projection 30 is engaged with the rear side of the vehicle body panel 54. The elastic projecting piece 20 is secured to the vehicle body panel 54. The attachment plate portion 50 is superposed on the front side surface 60 of the vehicle body panel 54 and is secured to the vehicle body panel 54 by a bolt passing through the bolt through-hole 52. Thus, the main body 12 is fitted into the attachment hole 56 and secured to the vehicle body panel 54.

When the connector holder 10 is inserted into the attachment hole 56, the one side wall 48 of the main body 12 contacts the first inner peripheral edge portion 58a while the other side wall 14 is separated apart from the second inner peripheral edge portion 58b. To compensate for the distance between the side wall 14 and the peripheral edge portion 58b, the elastic projecting piece 20 protrudes outward from the side wall 14 towards the second inner peripheral edge portion 58b, and as a result, the portion 58b is clamped between the engagement projection 30 and the attachment projection 32. Clearances 62 can be defined between the main body 12 and the second inner peripheral edge portion 58b at the upper and lower sides of the elastic projecting piece 20. The clearances 62 can receive a wire harness, a tool, or the like.

In the event that clearances 62 are defined between the main body 12 and the second inner peripheral edge portion 58b in the connector holder 10 constructed above, because the elastic projecting piece 20 extends from the main body 12 to the second inner peripheral edge portion 58b to be engaged with the portion 58b, the main body 12 can be inserted into the attachment hole 56 and can be secured to the vehicle body panel 54. Particularly, because the vehicle body panel 54 is clamped between the engagement projection 30 and attachment projection 32 provided on the elastic projecting piece 20, it is possible to strongly secure the elastic projecting piece 20 to the vehicle body panel 54. Further, in the exemplary embodiment, because the height of the attachment projection 32 protruding outward from the forward extending portion 24 is set to be greater than a height of the engagement projection 30, the attachment projection 32 cannot enter the attachment hole 56 by the elastic deformation of the elastic projecting piece 20 that enables the engagement projection 30 to enter the attachment hole 56. In other words, attachment projection 32 and the engagement projection 30 extend in a projection direction toward the peripheral edge portion 58b. Because the attachment projection 32 extends in the projection direction further than the engagement projection 30, deformation of the projecting piece 20 is sufficient to allow the engagement projection 30 to pass behind the peripheral edge portion 58b, while preventing the attachment projection 32 from passing through the attachment hole 56 and through the vehicle body panel 54, thereby more positively clamping the vehicle body panel 54.

When the connector holder 10 is removed from the vehicle body panel 54, the elastic deformation operating portion 44 that protrudes from the front side surface 60 of the vehicle body panel 54 is pushed by a finger toward the main body 12 to release engagement among the engagement projection 30, the attachment projection 32, and the vehicle body panel 54. Then, it is possible to release the connector holder 10 from the front side of the vehicle body panel 54 without inserting a special tool into the rear side of the vehicle body panel 54. Further, because the elastic deformation operating portion 44 on the elastic projecting piece 20 is disposed most apart from the curved portion 26, it is possible to elastically deform the elastic projecting piece 20 with a minimal force. Because the projecting end surface of the engagement projection 30 is formed into the slant surface 36 that extends along the second inner peripheral edge portion 58b in the attachment hole 56, it is possible to reduce the elastic deformation of the elastic projecting piece 20 required for drawing the engagement projection 30 from the attachment hole 56, and it is possible to prevent the engagement projection 30 from interfering with the second inner peripheral edge portion 58b, thereby enabling more smooth disengagement of the engagement projection 30.

In addition, because the curved portion 26 is coupled through the base projection 16 to the side wall 14, it is possible to reduce transmission of a stress concentrated in the curved portion 26 to the side wall 14, thereby ensuring sufficient strength of the side wall 14. Because the outward extending portion 22 of the elastic projecting piece 20 protrudes from the base projection 16 that protrudes outward from the side wall 14, it is possible to reduce a projecting dimension of the outward extending portion 22 in comparison with the case where the outward extending portion 22 protrudes directly from the side wall 14. Thus, because it is possible to mount the connector holder 10 in the attachment hole 56 by a greater fitting force than a long outward extending portion 22, it is possible to ensure a high precise of a required fitting force.

Because the connector holder 10 including the elastic projecting piece 20 are preferably molded out of a product such as synthetic resin, the construction of the connector holder 10 is simple and can ensure extremely high efficiency in cost.

A flange-like attachment plate portion 50 that has been known conventionally as a bolt-fastening type is adopted in the outer surface 42 that contacts the first inner peripheral edge portion 58a in the attachment hole 56 together with the elastic projecting piece 20 in the above embodiment. This can obtain an excellent fitting force. However, it is possible to combine the elastic projecting piece of the present invention with the conventional known attachment structure. The conventional known attachment structure may include a pin-lock mechanism or the like as well as the bolt-fastening mechanism in the above embodiment, as required.

It is possible to provide the main body of the electrical junction box with a plurality of elastic projecting pieces. For example, the whole outer peripheral surface of the main body of the electrical junction box may be separated apart from the inner peripheral edge section around the attachment hole, and the main body may be held in the attachment hole by the plural elastic projecting pieces.

Although the connector holder is exemplified as an electrical junction box in the above embodiment, the present invention can be applied to a fuse box, a relay box, a junction box, or the like.

What is claimed is:

1. An electrical junction box to be installed in an attachment hole located in a
   vehicle body panel of a motor vehicle, the electrical junction box comprising:
   a main body and an engagement fixing section provided on said main body, said main body being fitted into the attachment hole in the vehicle body panel, said engagement fixing section being secured to said vehicle body panel,
   wherein an elastic projecting piece is integrally provided on said main body, said elastic projecting piece protrudes from an outer surface of said main body and extends in a direction opposite from a fitting direction toward said attachment hole, said elastic projecting piece being provided with an engagement projection and an attachment projection that protrude from a surface opposite to said main body, said engagement and attachment projections facing each other in an extending direction of said elastic projecting piece at a distance corresponding to the thickness of a wall of the vehicle body panel in which the attachment hole is located, to form the engagement fixing section, and wherein elastic deformation of said elastic projecting piece permits said main body to be fitted into said attachment hole, and an inner peripheral edge section in said attachment hole is sandwiched between said engagement and attachment projections.

2. An electrical junction box according to claim 1, wherein said attachment projection is disposed outside said engagement projection in said extending direction of said elastic projection piece, and a projecting height of said attachment projection is set to be greater than that of said engagement projection.

3. An electrical junction box according to claim 1, wherein said elastic projecting piece is provided on a distal end with an elastic deformation operating portion that elastically deforms said elastic projecting piece toward said main body in a releasing direction of said elastic projecting piece.

4. An electrical junction box according to any one of claim 1, wherein said main body is integrally provided with a base projection that protrudes from the outer surface of said main body, and said elastic projecting piece protrudes further outward from said base projection.

5. An electrical junction box to be installed and removed from an attachment hole in a wall, the hole having a width and the wall having a thickness, the electrical junction box comprising:
   a main body having a first side wall and a second side wall, the main body sized to fit in the attachment hole in an insertion direction; and
   a securing portion extending in a projecting direction from the main body toward an edge of the attachment hole, the securing portion further comprising:
      a base projection attached to the first side wall of the main body;
      an elastic projecting piece, having a proximal end and a distal end, the proximal end being attached to the base projection and the distal end configured to bend toward the main body, a distance from the second side wall to the distal end corresponding to the width of the hole;
      an attachment projection configured at the distal end of the elastic projecting piece, the attachment projection extending from the distal end substantially in the projecting direction; and
      an engagement projection configured at the proximal end of the elastic projecting piece, the engagement projection extending from the proximal end substantially in the projecting direction and spaced apart from the attachment projection by a distance corresponding to the thickness of the wall.

6. An electrical junction box according to claim 5, wherein the attachment projection extend away from the main body in the projection direction further than the engagement projection.

* * * * *